US011349747B1

(12) United States Patent
Trundle

(10) Patent No.: US 11,349,747 B1
(45) Date of Patent: *May 31, 2022

(54) HYBRID MESH NETWORK MONITORING SIGNALING ENVIRONMENT

(71) Applicant: Alarm.com Incorporated, Tysons, VA (US)

(72) Inventor: Stephen Scott Trundle, Falls Church, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/572,121

(22) Filed: Sep. 16, 2019

Related U.S. Application Data

(63) Continuation of application No. 16/215,125, filed on Dec. 10, 2018, now Pat. No. 10,419,331, which is a continuation of application No. 15/069,100, filed on Mar. 14, 2016, now Pat. No. 10,153,966.

(60) Provisional application No. 62/132,371, filed on Mar. 12, 2015.

(51) Int. Cl.
*G06F 15/173* (2006.01)
*H04L 45/00* (2022.01)
*H04L 43/08* (2022.01)
*H04L 43/04* (2022.01)
*H04L 41/0695* (2022.01)
*G08B 25/00* (2006.01)

(52) U.S. Cl.
CPC ............ *H04L 45/22* (2013.01); *G08B 25/004* (2013.01); *H04L 41/0695* (2013.01); *H04L 43/04* (2013.01); *H04L 43/08* (2013.01); *G08B 25/008* (2013.01); *H04L 45/70* (2013.01)

(58) Field of Classification Search
CPC . G08B 25/004; G08B 25/008; H04L 41/0695; H04L 43/04; H04L 43/08; H04L 45/22; H04L 45/70
See application file for complete search history.

(56) References Cited

U.S. PATENT DOCUMENTS

| 5,455,569 A | 10/1995 | Sherman et al. |
| 5,974,236 A * | 10/1999 | Sherman ............. H04W 40/125 709/221 |
| 8,082,491 B1 * | 12/2011 | Abdelaziz ........... G06F 16/9537 715/234 |
| 8,779,919 B1 * | 7/2014 | Darling .................... H04W 4/90 340/539.16 |

(Continued)

OTHER PUBLICATIONS

"7450-XLT RF subscriber unit for alarm transmission with full data transfer!" AES Corporation, IntelliNet for Alarm Monitoring, 2006, 2 pages.

(Continued)

*Primary Examiner* — Chris Parry
*Assistant Examiner* — Dixon F Dabipi
(74) *Attorney, Agent, or Firm* — Fish & Richardson P.C.

(57) ABSTRACT

Techniques are described to improve the robustness of communication of critical life safety data when broadband networks are used as uphaul networks. Monitoring systems are examples of critical monitoring appliances, but the techniques described throughout this disclosure may be applied to any type of critical monitoring appliances, such as life-support devices, fire detectors, smoke detectors, and the like.

20 Claims, 10 Drawing Sheets

(56) References Cited

U.S. PATENT DOCUMENTS

| | | | |
|---|---|---|---|
| 9,615,226 B2* | 4/2017 | Petite | H04M 11/04 |
| 10,153,966 B1 | 12/2018 | Trundle | |
| 2003/0078029 A1* | 4/2003 | Petite | H04M 11/04 |
| | | | 455/404.1 |
| 2006/0067282 A1 | 3/2006 | Sherman et al. | |
| 2009/0276522 A1* | 11/2009 | Seidel | H04L 43/12 |
| | | | 709/224 |
| 2009/0315699 A1* | 12/2009 | Satish | H04L 47/125 |
| | | | 340/533 |
| 2010/0281312 A1* | 11/2010 | Cohn | H04W 40/34 |
| | | | 714/49 |
| 2011/0246658 A1* | 10/2011 | Dettori | H04L 67/1008 |
| | | | 709/231 |
| 2012/0184207 A1* | 7/2012 | Gaines | H04W 48/18 |
| | | | 455/11.1 |
| 2012/0259988 A1* | 10/2012 | Erringer | H04L 67/148 |
| | | | 709/228 |
| 2013/0286942 A1* | 10/2013 | Bonar | H04L 45/24 |
| | | | 370/328 |
| 2015/0256337 A1* | 9/2015 | Nguyen | H04W 4/80 |
| | | | 713/171 |

OTHER PUBLICATIONS

"7788F RF subscriber unit: Installation and operation manual," AES Corporation, IntelliNet for Alarm Monitoring, Nov. 14, 2008, 36 pages.

"AES 7067 IntelliTap-II digital dialer interface: A supplemental alarm reporting device," AES Corporation, Aug. 2004, 4 pages.

"AES 7170 IP-Link Transceiver (Remote & Local): Installation and Operation Manual," AES Corporation, IntelliNet for Alarm Monitoring, Aug. 10, 2009, 27 pages.

"AES intellitap 7067: Full data for burglary monitoring through the DACT," AES Corporation, IntelliNet for Alarm Monitoring, 2004, 1 page.

"AES-IntellinetTM announces launch of interactive security services," AES Corporation, Security Products, Jan. 17, 2013, 4 pages.

"Alarm Automation Output Specification," AES Corporation, IntelliNet for Alarm Monitoring, Aug. 2004, Appendix A1, 8 pages.

AES IntelliNet Property Owner Information: AES wireless fire alarm monitoring reduces costs for property owners, Easton Electronics, Dec. 2015, 3 pages.

\* cited by examiner

HYBRID MESH NETWORK MONITORING SIGNALING ENVIRONMENT

CROSS-REFERENCE TO RELATED APPLICATIONS

This application is a continuation of U.S. application Ser. No. 16/215,125, filed Dec. 10, 2018, now allowed, which is a continuation of U.S. application Ser. No. 15/069,100, filed Mar. 14, 2016, now U.S. Pat. No. 10,153,966, issued Dec. 11, 2018, which claims the benefit of U.S. Provisional Application Ser. No. 62/132,371, filed Mar. 12, 2015. All of these prior applications are incorporated by reference in their entirety.

TECHNICAL FIELD

This application generally relates to monitoring technology, and more particularly, signal transmissions associated with monitoring technology.

BACKGROUND

Monitoring systems can be designed to detect intrusions and/or the presence of other emergency situations (e.g., fires, carbon monoxide leakage, medical emergencies, etc.) through the use of integrated sensors placed in various locations of a property. For instance, monitoring systems can include control units that detect monitoring system data such as sensor inputs, track arm/disarm statuses, and/or signal instructions. The monitor control units can then transmit the detected monitoring system data to a central monitoring station.

SUMMARY

Techniques are described for improving the reliability and versatility of monitoring signaling by defining additional paths for monitoring signal transmissions. Monitoring systems are typically dependent upon communication paths between properties where the systems are located to a central application monitoring station. These communication paths may either be plain ordinary telephone systems (POTS), cellular, broadband, or any combinations of these network paths. Although each of these network paths have their respective advantages and disadvantages, given that the communication path is critical to proper functioning of the system, the stability of these communication paths are a primary concern to providing security monitoring services that involve critical life safety data. The communication paths of existing monitoring systems are vulnerable to external circumstances such as power and internet failures, susceptibility to invasions by intruders, and signal disruption from extreme weather conditions.

Accordingly, techniques are described to improve the robustness of communication of critical life safety data when broadband networks are used as uphaul networks. Monitoring systems are examples of critical monitoring appliances, but the techniques described throughout this disclosure may be applied to any type of critical monitoring appliances, such as life-support devices, fire detectors, smoke detectors, etc.

In some implementations, a computer-implemented method includes: receiving, by a monitoring server and through a first communication pathway between the monitoring server and a first communication device associated with a first monitoring system of a first property, one or more data transmissions related to detection of events at the first property by the first monitoring system; accessing, from electronic storage, one or more transmission standards defined for transmission of monitoring system data by the first monitoring system of the first property; evaluating, by the monitoring server, the first communication pathway against the one or more transmission standards based on the one or more data transmissions; based on the evaluation of the first communication pathway against the one or more transmission standards, determining, by the monitoring server, that the first communication pathway does not presently satisfy the one or more transmission standards; based on the determination that the first communication pathway does not presently satisfy the one or more transmission standards, identifying a second communication device that is configured to exchange data transmissions with the monitoring server through a second communication pathway and that is configured to exchange data transmissions with the first communication device through a peer communication pathway, the second communication device being associated with a second monitoring system of a second property that is distinct from the first property; and reconfiguring, by the monitoring server, the first communication device to transmit monitoring system data detected by the first monitoring system at the first property through the peer communication pathway to the second communication device associated with the second monitoring system of the second property, the second communication device being configured to relay monitoring system data received through the peer communication pathway to the monitoring server through the second communication pathway.

Other versions of these and other aspects disclosed herein include corresponding devices, systems, and computer programs encoded on computer-readable storage devices that are configured to perform the actions of the methods. These and other aspects may include one or more of the features discussed below.

Implementations may include one or more optional features. For instance, in some implementations, the method may include: generating, by the monitoring server, an encryption code for the monitoring system data detected by the first monitoring system at the first property; and transmitting, by the monitoring server, an instruction to the first communication device, to encrypt the monitoring system data detected by the first monitoring system at the first property based on the generated encrypted code; where the encrypted monitoring system data detected by the first monitoring system at the first property is inaccessible to the second communication device associated with the second monitoring system of the second property when the second communication device relays the encrypted monitoring system data through the second communication pathway.

In some implementations, the method includes: receiving, by the monitoring server and from the first communication device, first monitoring system data transmitted through the first communication pathway; receiving, by the monitoring server and from the second communication device, second monitoring system data transmitted through the second communication pathway; identifying, by the monitoring server, a portion of first monitoring system data that includes data that is substantially similar to a portion of the second monitoring system data; processing, by the monitoring server, the first monitoring system data and the second monitoring system data to remove the respective portions of the first monitoring system data and the second monitoring system data that include data that is substantially similar;

and storing, by monitoring server, the processed first monitoring system data and the processed second monitoring system data.

In some implementations, the first communication device is reconfigured to transmit monitoring system data to the second communication device based on a set of user-defined settings associated with the first monitoring system of the first property.

In some implementations, determining that the first communication pathway does not presently satisfy the one or more transmission standards includes at least one of: determining that a cost associated with transmitting the monitoring system data detected by the first monitoring system at the first property through the first communication pathway is greater than a threshold cost for transmission, and determining that a transmission latency associated with transmitting the monitoring system data detected by the first monitoring system at the first property through the first communication pathway is greater than a threshold transmission latency.

In some implementations, identifying the second communication device that is configured to exchange data transmissions with the monitoring server through the second communication pathway includes: identifying, by the monitoring system, a plurality of communication devices that are configured to exchange data transmissions with the monitoring server through a plurality of communication pathways, the plurality of communication devices being associated with a plurality of properties that are predetermined to be nearby the first property and configured to exchange data transmissions with the first communication device through a plurality of peer communication pathways; evaluating each of the plurality of peer communication pathways of the plurality of communication devices against the one or more transmission standards defined for transmission of monitoring system data by the first monitoring system of the first property; and selecting a particular communication device from among the plurality of communication devices based on evaluating each of the plurality of peer communication pathways of the plurality of communication devices against the one or more transmission standards defined for transmission of monitoring system data by the first monitoring system of the first property.

In some implementations, the one or more data transmissions related to detection of events at the first property by the first monitoring system include alarm data indicating detection of a critical alarm event at the first property.

Implementations of the described techniques may include hardware, a method or process implemented at least partially in hardware, or a computer-readable storage medium encoded with executable instructions that, when executed by a processor, perform operations.

The details of one or more implementations are set forth in the accompanying description below. Other features will be apparent from the description of the drawings.

DETAILED DESCRIPTION

Figure 1:
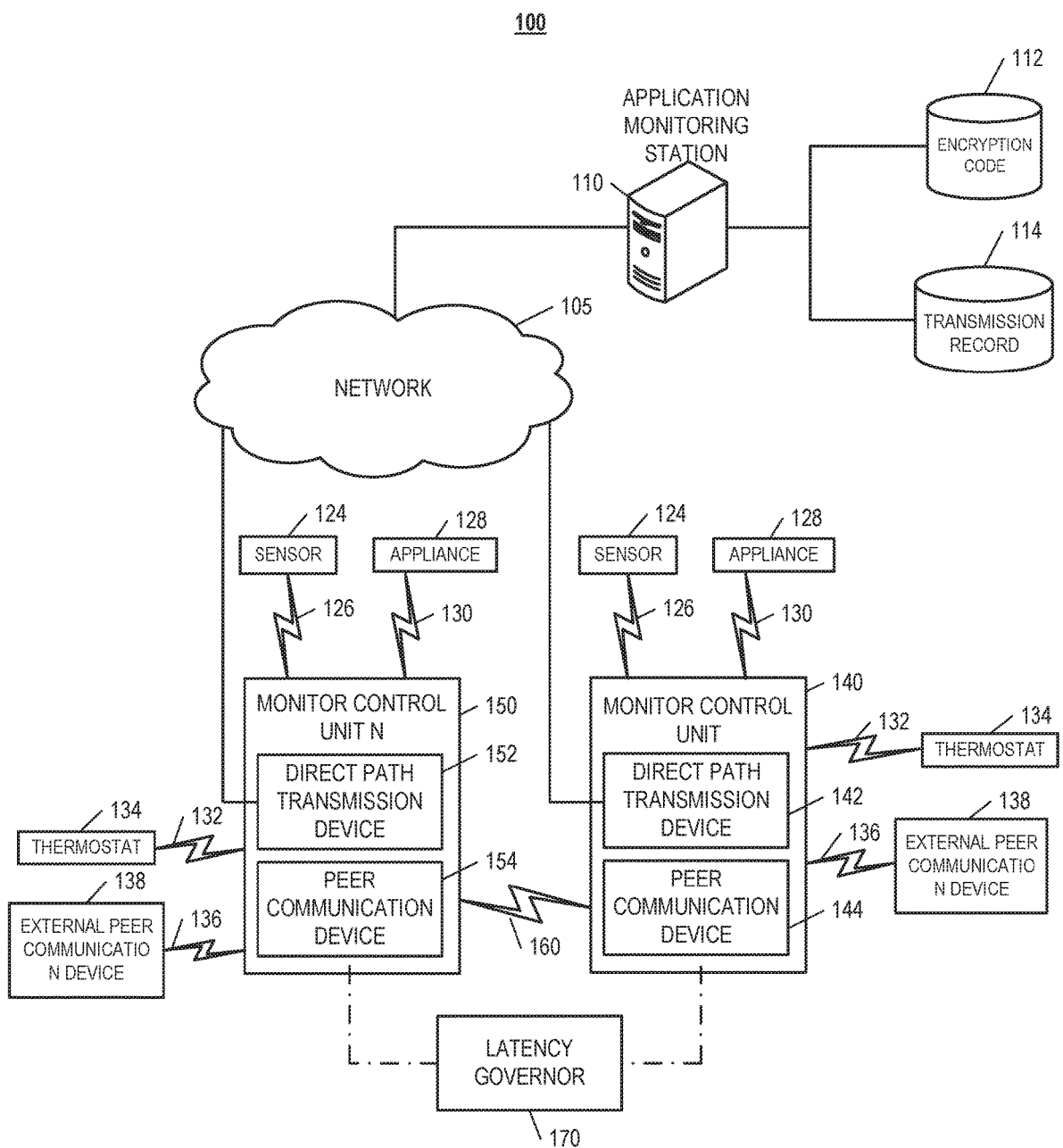
FIG. 1 illustrates an example of an electronic system configured to communicate critical data using broadband networks as uphaul networks.

Given the differences in communication paths from various properties that all report to the same monitoring server, certain of the properties may offer faster, more reliable, and/or less expensive communications paths for data transmission to the monitoring server. For instance, a first property may include a broadband Internet connection, a second property may include a POTS connection, a third property may include a 3G cellular connection, and a fourth property may include an LTE cellular connection. All of these properties also may include peer communication devices that are capable of forming a peer-to-peer wireless mesh network that enables exchange of wireless communications between the properties. For instance, the peer communication devices may communicate over a wireless connection that extends approximately thirty feet and enables one property to communicate with one or more neighboring properties, but no further. In this case, the peer communication devices coordinate to establish a peer-to-peer network that enable all of the properties to communicate, even though some cannot communicate directly. Communications may flow through a string of peer communication devices from the first property to the fourth property and back from the fourth property to the first property.

The properties then use the peer-to-peer network to provide data to the monitoring server in the most efficient and reliable manner as dictated by the data to be transmitted. For example, for non-critical data, data communications may be passed to the first property for transmission through the broadband Internet connection of the first property that does not incur any additional cost in transmission. In another example, for critical alarm data, data communications may be passed to the second property for transmission through the reliable POTS connection. As yet another example, an outage or tapering activity may render wired connections at the first and second properties unavailable. In this example, data communications may be passed to the fourth property for transmission through the LTE cellular connection, which is faster than the 3G cellular connection at the third property. Many examples are possible and the properties connected through the peer-to-peer network may make any appropriate decisions on how to best transmit data to the monitoring server based on cost, speed, and/or reliability.

Given that monitoring system data may flow to properties other than the property that generated the data, encryption of the data and identification of the source of the data may be needed. Accordingly, in some implementations, the system may receive one or more encryption codes via a direct path transmission from an application monitoring station. The system may establish a communication path with a second peer communication device using the one or more encryption codes. The system may perform a test to automatically verify and evaluate the communication path. Finally, the system may designate the peer-to-peer communication path as the primary path for monitoring signal data transmission.

In some implementations, the system may receive a first monitoring signal from a primary communication device via a communication path. The system may store data from the first received monitoring signal into a transmission record for a period of time. The system may receive a second monitoring signal from a communication device via the communication path. The system may compare data from the second received signal to data stored on the transmission record. The system may then determine if the data from the second received signal has been processed based on comparing the data from the second received signal to the data stored on the transmission record. Finally, the system may perform a de-duplication operation based on determining the data from the second received signal has been processed.

FIG. 1 illustrates an example of an electronic system 100 configured to communicate critical data using broadband networks as uphaul networks. The electronic system 100 includes an application monitoring station 110, a network 105, and monitoring system control units 140, 150 that are located at and monitor different properties. In some examples, the network 105 facilitates communication between the application monitoring station 110, and the one or more monitor control units 140, 150.

The network 105 is configured to enable exchange of electronic communications between devices connected to the network 105. The network 105 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. The network 105 may include multiple networks or subnetworks, each of which may include, for example, a wired or wireless data pathway. The network 105 may include a circuit-switched network, a packet-switched data network, or any other network able to carry electronic communications (e.g., data or voice communications). For example, the network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 105 may include one or more networks that include wireless data channels and wireless voice channels. The network 105 may be a wireless network, a broadband network, or a combination of networks including a wireless network and a broadband network.

The application monitoring station 110 is an electronic device configured to provide monitoring services by exchanging electronic communications with the one or more monitoring system control units 140, 150, over the network 105. For example, the application monitoring station 110 may be configured to monitor events (e.g., alarm events) generated by the one or more monitoring system control units 140, 150. In this example, the application monitoring station 110 may exchange electronic communications with the direct path transmission devices 142 and 152 included in the one or more monitoring system control units 140, 150, respectively, to receive information regarding events (e.g., alarm events) detected by the one or more monitoring system control units 140, 150. The application monitoring station 110 may use the received information to store one or more encryption codes 112 and one or more transmission records 114 associated with the one or more monitoring system control units 140, 150. The one or more encryption codes 112 are device-specific identifiers that allows the system 100 to identify transmissions generated by the one or more monitoring system devices 140, 150. The transmission record 114 includes a repository of archived monitoring signal data that tracks the source generating the data and/or the communication path used to transmit the data to the application monitoring station 110.

The one or more monitoring system control unit 140, 150 may be configured to receive input from one or more sensors or detectors 124. For example, as represented in FIG. 1, the monitoring system control unit 140 may be configured to receive data from multiple sensors 124. The sensors 124 may include a contact sensor, a motion sensor, a glass break sensor, or any other type of sensor included in an alarm system or a security system. The sensors 124 may also include an environmental sensor, such as a temperature sensor, a water sensor, a rain sensor, a wind sensor, a light sensor, a smoke detector, a carbon monoxide detector, an air quality sensor, etc. The sensors 124 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors may include a radio-frequency identification (RFID) sensor that identifies a particular article that includes a pre-assigned RFID tag. In addition, the sensors 124 may include a video/photographic camera or other type of optical sensing device configured to capture images and may include an energy consumption sensor for appliances and devices in a property monitored by the monitoring system.

The one or more monitoring system control units 140, 150 communicate with modules 128 and 134 and sensors 124 to perform system monitoring and control. The module 128 is connected to one or more appliances, is configured to monitor activity of the one or more devices, and is configured to control operation of the one or more appliances. The module 128 may directly measure activity of the one or more appliances or may estimate activity of the one or more appliances based on detected usage of the one or more appliances. The module 128 may communicate energy monitoring information to the one or more monitoring system control units 140, 150 and may control the one or more appliances based on the commands received from the one or more monitoring system control units 140, 150.

The module 134 is connected to a thermostat, is configured to monitor temperature of a temperature regulation system associated with the thermostat, and is configured to control operation of the thermostat. The module 134 may directly measure activity of the temperature regulation system associated with the thermostat or may estimate activity of the temperature regulation system associated with the thermostat based on the detected temperature of the temperature regulation system associated with the thermostat. The module 134 also may determine energy usage information based on the activity, communicate energy monitoring information to the one or more monitoring system control units 140, 150, and control the thermostat based on commands received from the one or more monitoring system control units 140, 150.

The modules 128, 134, and sensors 124 communicate with the monitoring system control unit 140 over communication links 130, 132, and 126, respectively. The communication links 130, 132, and 126 may be a wired or wireless data pathway configured to transmit signals from the modules 128, 134, and sensors 124 to the monitoring system control unit 140. The modules 124, 128, and sensors 124 may continuously transmit sensed values to the one or more monitoring system control units 140, 150, periodically transmit sensed values to the one or more monitoring system control units 140, 150, or transmit sensed values to the one or more monitoring system control units 140, 150 in response to a change in a sensed value.

The one or more monitoring system control units 140, 150 include direct path transmission devices 142 and 152, respectively, and peer communication devices 144 and 154, respectively. The direct path transmission devices 142 and 152 are communication devices configured to exchange communication over the network 105. The direct path transmission devices 142 and 152 may be wireless communication modules configured to exchange wireless communications over the network 105. For example, the direct path transmission devices 142 and 152 may be wireless communication devices configured to exchange communications over a wireless data channel and a wireless voice channel. In this example, the direct path transmission devices 142 and 152 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The direct path transmission devices 142 and 152 may also may be wired communication modules configured to exchange communications over the network 105 using a wired connection. For instance, the direct path transmission devices 142 and 152 may be modems, network interface cards, or another type of network interface devices. The direct path transmission devices 142 and 152 may be Ethernet network cards configured to enable the one or more monitoring system control units 140, 150 to communicate over a local area network and/or the Internet. The direct path transmission devices 142 and 152 also may be voiceband modems configured to enable the alarm panel to communicate over the telephone lines of Plain Old Telephone Systems (POTS).

In some examples, the direct path transmission devices 142 and 152 may include a processor or other control circuitry configured to execute instructions of a program that controls operation of an alarm system. In these examples, the one or more direct path transmission devices may be configured to receive input from sensors, detectors, or other devices included in the alarm system and control operations of devices included in the alarm system or other household devices (e.g., a thermostat, an appliance, lights, etc.). For example, the direct path transmission devices 142 and 152 may be configured to control operation of the peer communication devices 144 and 154 included in the one or more monitoring system control units 140, 150.

The peer communication devices 144 and 154 are communication devices configured to exchange communications between similar devices in a peer-to-peer manner. In some instances, the peer communications devices 144 and 154 may exchange data between the one or more monitoring system control units 140, 150 using a peer-to-peer communication path 160. For instance, the peer communication devices 144 and 154 may communicate using various local wireless protocols such as wife, Bluetooth, zwave, zigbee, or wired protocols such as Ethernet and USB, to connect the one or more monitoring system control units 140, 150 to each other and other monitoring system control units. The local connection may improve the speed of status and control communications because communicating through the network 105 with a remote server (e.g., the application monitoring station 110) may be significantly slower.

In some implementations, the one or more monitoring system control units 140, 150 may be configured to communicate with external peer communication devices 138 nearby the property to enable or amplify signal transmission between the peer communication devices 144 and 154. For example, the external communication devices 138 may be communication relay devices placed nearby a housing unit (e.g., backyard) and maintain continuous communications between the one or more monitoring system units 140, 150 located within the property. In such examples, the external peer communication devices 138 may function either as a signal aggregator for the peer communication devices 144 and 154 for signal transmission over the peer-to-peer communication path 160, or a backup transmitting device that is enabled when the peer communication devices 144 and 154 within the property are unavailable to transmit signal data.

The peer communication devices 144 and 154 receive the one or more encryption codes 112 from the application monitoring station 110 through the direct path devices 142 and 152, respectively over the network 105. The one or more encryption codes 112 may allow transmission between peer communication devices 144 and 154 over the peer-to-peer communication path 160 by identifying and verifying the one or more monitoring system control units 140, 150. In some instances, the peer-to-peer communication path 160 is tested and evaluated for a period of time before the peer-to-peer communication path 160 is designated a primary or acceptable communication path for the one or more monitoring system control units 140, 150. In such instances, the peer-to-peer communication path 160 may replace the existing data communication pathway between the one or more monitoring system control units 140, 150 and the application monitoring station 110 over network 105 for transmitting monitoring signal data.

In some implementations, the peer-to-peer communication path 160 is used as a redundant communication pathway to the primary path between the one or more monitoring system control units 140, 150 and the application monitoring station 110 over the network 105. For instance, the one or more monitoring system control unit 140, 150 may transmit monitoring signal data through the direct path transmission devices 142 and 152, respectively, as well as the communication path 160. In such instances, monitoring signal data received by the application monitoring station 110, may be de-duplicated to prevent duplicate processing and analysis of identical monitoring signal data. Monitoring signal data transmitted to the application monitoring station 110 may be de-duplicated by comparing all received monitoring signal data from the direct path transmission devices 142 and 152, and the peer-to-peer communication path 160 to the transmission record 114. When duplicate monitoring signal data is received by the application monitoring station 110, the system 100 compares the received data to transmission record 114 and the received data is ignored.

In some examples, the peer-to-peer communication path 160 is a mesh network of peer devices that are capable of communicating with one another over a wireless protocol, such as a short-range wireless protocol. The peer devices may or may not be able to uphaul data to the application monitoring station 110. For instance, the peer communication devices 144, 154 may be able to uphaul data, but the external peer communication devices 138 may not be able to uphaul data and, instead, merely route data between peer devices in control units, such as the peer communication devices 144, 154. In this regard, the external peer communication devices 138 operate to pass monitoring system data between control units in other properties in an effort to identify the most cost effective manner of uphauling the data to the application monitoring station 110. For example, the monitoring system control unit 140 may be only able to uphaul data over a cellular connection, whereas the monitoring system control unit 150 may be able to uphaul data over a broadband Internet connection. In this example, at least for less critical data, the monitoring system control unit 140 takes advantage of the less expensive broadband Internet connection of the monitoring system control unit 150 and sends monitoring system data over the peer-to-peer communication path 160 to the monitoring system control unit 150 for transmission in a less costly manner. In addition, at least some of the external peer communication devices 138 may be able to uphaul data to the application monitoring station 110 (e.g., over a cellular connection) in the event a less costly or sufficiently efficient path is unavailable or not found on the peer-to-peer communication path 160.

In some implementations, a latency governor 170 may be used with the one or more monitoring system control units 140, 150 to modulate the communication between the one or more monitoring system control units 140, 150 over the communication path 160. In some instances, the latency governor 170 may be an automated computer-implemented protocol that monitors the latency of the monitoring signal data transmission between the peer communication devices 144 and 154 of the one or more monitoring system control units 140, 150 after the generation of an alarm event within the properties where the one or more monitoring system control units 140, 150 are located. For example, the latency governor 170 may enable or disable the peer-to-peer communication path 160 based on comparing the monitoring signal data latency to a threshold value.

In some implementations, the latency governor 170 may be an automated computer-implemented protocol within the application monitoring station 110 that terminates an existing peer-to-peer communication path 160 between one or more monitoring system control units 140, 150 and establishes a different communication path to lower the latency of monitoring signal data transmission to the application monitoring station 110. In addition, the latency governor 170 also may modulate the connection between the one or more monitoring system control units 140, 150 and the application monitoring station 110 to optimize the data transmission of monitoring signal data generated by the one or more monitoring system control units 140, 150. In such instances, the configuration settings of the latency governor 170 may be based on the data transmission to from the peer communication devices 144 and 154.

In some implementations, the latency governor 170 may be a controller that includes hardware configurations for the application monitoring station 110 that controls monitoring signal data transmission via the direct path transmission devices 142 and 152 of the one or more monitoring system control units 140, 150, respectively. For instance, the latency governor 170 may determine that the latency of the monitoring signal data transmission from the one or monitoring system control units 140, 150 is above a threshold value. In such an instance, the application monitoring station 110 may disable data transmission between peer communication devices 144 and 154 over peer-to-peer communication path 160, and enable monitoring signal data transmission to the application monitoring station 110 via the direct path transmission devices 142 and 152 over the network 105.

Figure 2:
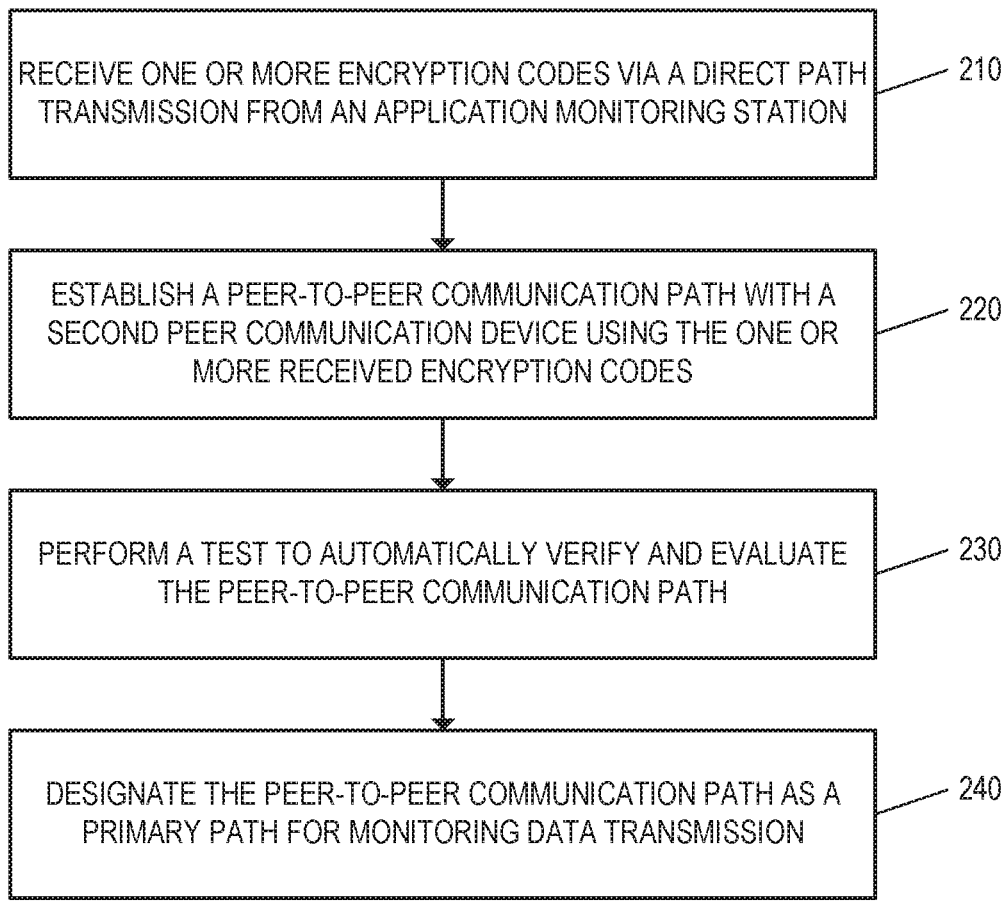
FIG. 2 illustrates an example of a process for establishing and designating a communication path for monitoring signal data transmission.

FIG. 2 is a flowchart for establishing and designating a communication path for monitoring signal data transmission. The operations of the example process 200 are described generally as being performed by the system 100. The operations of the example process 200 may be performed by one of the components of the system 100 (e.g., the application monitoring station 110, the one or more monitoring system control units 140, 150, etc.) or may be performed by any combination of the components of the system 100. In some implementations, operations of the example process 200 may be performed by one or more processors included in one or more electronic devices.

Briefly, the system 100 receives one or more encryption codes via a direct path transmission from an application monitoring station (210). The system 100 establishes a peer-to-peer communication path with a second peer communication device using the one or more encryption codes via a peer-to-peer communication path (220). The system 100 performs a test to automatically verify and evaluate the peer-to-peer communication path (230). The system 100 designates the peer-to-peer communication path as the primary path for monitoring signal transmission (240).

The example process 200 begins when the system 100 receives one or more encryption codes via a direct path transmission from an application monitoring station (210). In some instances, an encryption code is associated with an alarm system connected to the application monitoring station. For example, the system 100 may use unique encryption codes for the one or more monitoring system control units 140, 150 and transmit them to the application monitoring station 110, where they may be stored as one or more encryption codes 112. The one or more encryption codes 112 may be transmitted to the application monitoring station 110 via the direct path transmission devices 142 and 152 over network 105 and/or communicated from the application monitoring station 110 to the direct path transmission devices 142 and 152 over network 105.

The system 100 establishes a peer-to-peer communication path with a second peer communication device within using the one or more encryption codes (220). For example, the communication path may be the peer-to-peer communication path 160 between the one or more monitoring system control units 140, 150 between the peer communication devices 144 and 154. In such examples, the peer-to-peer communication path 160 may be wireless or wired connection protocols that allow the one or more monitoring system control units 140, 150 to exchange monitoring signal data between the peer communication devices 144 and 154, respectively. The system 100 may establish the communication path 160 between the specific devices by using the one or more encryption codes 112 associated with the one or more monitoring system control units 140, 150 to create a bridge between the peer communication devices 144 and 154.

The system 100 performs a test to automatically verify and evaluate the peer-to-peer communication path (230). For example, the system 100 may perform a transmission verification test by transmitting a preliminary signal between the one or more monitoring system control units 140, 150 over the peer-to-peer communication path 160. In such an example, the system 100 may measure performance parameters, such as signal latency, transfer rates, or network integrity, while conducting tests such as data hash comparisons and cyclic redundancy checks to determine the speed, accuracy and efficiency of the data transmission over the peer-to-peer communication path 160. In addition, the system 100 may compare the characteristics of the transmitted monitoring signal data to the original monitoring signal data generated at the property where the one or more monitoring system control units 140, 150 may be located to determine the data retention during the transmission between peer communication devices 144 and 154.

In some examples, the system 100 may test the reliability of the network connections between the direct path transmission devices 142 and 152 and the application monitoring station 110 over network 105. In such examples, the system 100 may conduct network infrastructure monitoring, diagnostics, analysis, and performance management across the network 105 to optimize the connections with the direct path transmission devices 142 and 152 based on the hardware configurations of the one or more monitoring system control units 140, 150.

The system 100 designates the peer-to-peer communication path as a primary path for monitoring signal transmission (240). For example, based on testing of the peer-to-peer communication path 160, the system 100 may limit alternative communication pathways for the monitoring signal data from the one or more monitoring system control units 140, 150 over the network 105. In such examples, the system 100 may compare the transmission performance between the peer-to-peer communication path 160 to alternative communication pathways to designate the primary path for monitoring signal data.

In some implementations, the system 100 may utilize the application monitoring station 110 as a backend controller to designate communication pathways for monitoring signal data between the one or more monitoring system control units. In some instances, the application monitoring station 110 may temporarily disable transmission of monitoring signal data from the direct path transmission devices 142 and 152 to allow transmission via the peer communication pathway 160. In such instances, the application monitoring station 110 monitors the multiple communication pathways formed between one or more monitoring system control units 140, 150 and designates a primary path based on conducting tests on each pathway to determine the most efficient communication pathway.

In some implementations, the system 100 may utilize the multiple communication pathways as a redundant transmission mechanism to the primary communication pathway. In some instances, the system 100 may use the primary path to transmit critical life-safety monitoring signal data and use the alternative communication pathways to transmit other monitoring signal data identified as non-crucial. For example, the application monitoring station 110 may initially monitor the generated monitoring signal data in the one or more monitoring system control units 140, 150 and assign different categories for the monitoring signal data based its severity within the transmission record 114. The system 100 may subsequently transmit the categorized monitoring signal data across the relevant communication pathway based on the need for a fast transmission. In such examples, the life-critical monitoring signal data may be transmitted through the primary pathway, whereas the non-critical monitoring signal data may be transmitted through alternative pathways.

Figure 3:
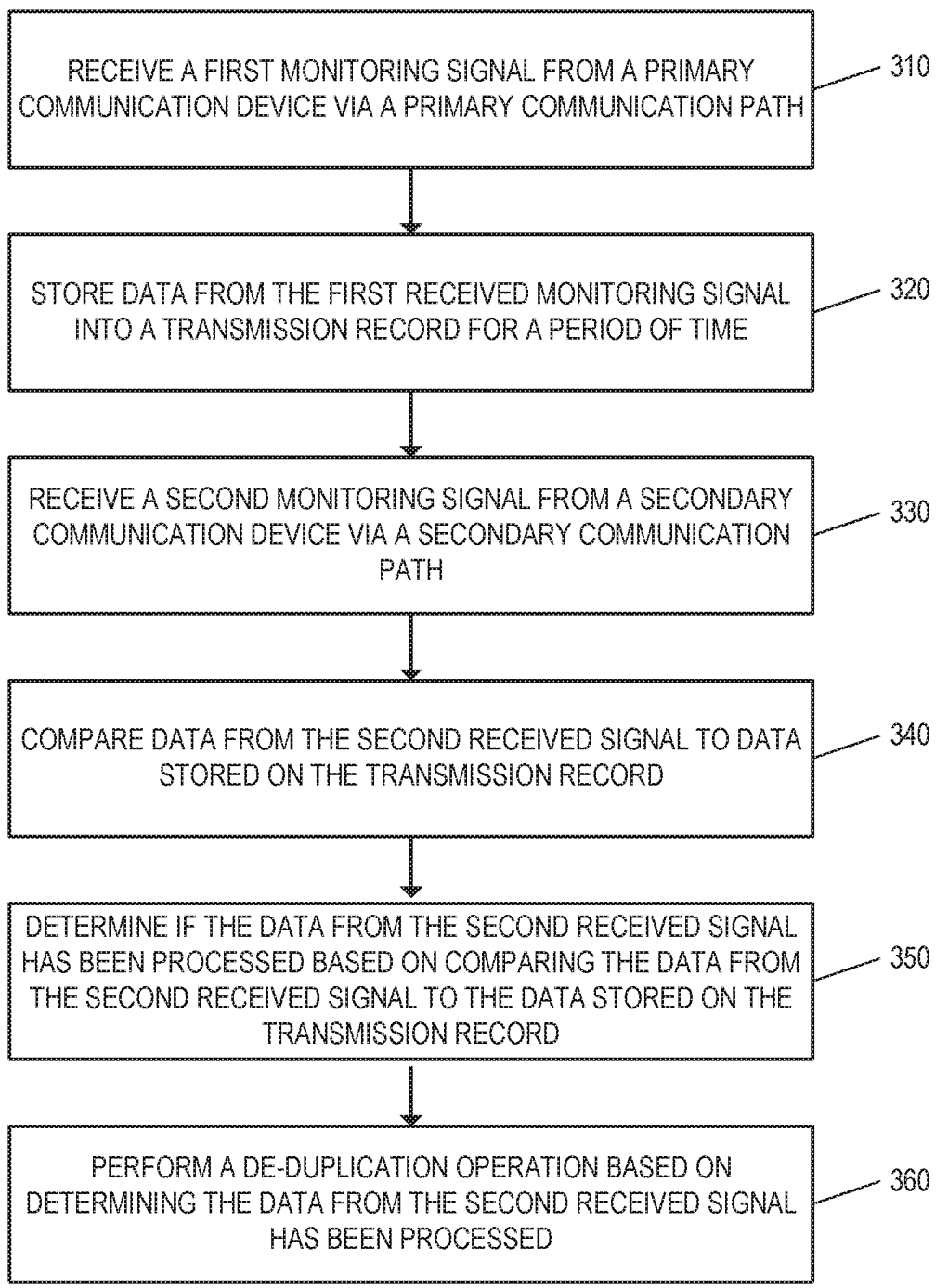
FIG. 3 illustrates an example of a process for performing de-duplication operations of monitoring signal data.

FIG. 3 illustrates an example process 300 for performing de-duplication operations of monitoring signal data. The operations of the example process 300 may be performed by one of the components of the system 100 (e.g., the application monitoring station 110, the one or more monitoring system control units 140, 150, etc.) or may be performed by any combination of the components of the system 100. In some implementations, operations of the example process 300 may be performed by one or more processors included in one or more electronic devices.

Briefly, the system 100 receives a first monitoring signal from a primary communication device via a primary communication path (310). The system 100 stores data from the first received monitoring signal into a transmission record for a period of time (320). The system 100 receives a second monitoring signal from a secondary communication device via the communication path (330). The system 100 compares data from the second received signal to data stored on the transmission record (340). The system 100 determines if the data from the second received signal has been processed based on comparing the data from the second received signal to the data stored on the transmission record (350). The system 100 performs a de-duplication operation based on determining the data from the second received signal has been processed (360).

The process 300 begins when system 100 receives a first monitoring signal from a primary communication device via a primary communication path (310). For example, the primary communication device may be one or more monitoring system control units 140, 150. In such examples, the monitoring signal data may be received by the application monitoring station 110 over the network 105. In addition, the primary communication path may include a network pathway between the application monitoring station 110 and the direct path transmission devices 142 and 152 over network 105.

The system 100 stores data from the first received monitoring signal into a transmission record for a period of time (320). For example, the application monitoring station 110 may store the received monitoring signal data from the one or more monitoring system control units 140, 150 into the transmission record 114. In this example, the transmission record 114 may include characteristics of the monitoring signal data, such as information from sensors, detectors, or other devices included in the alarm system and control operation of the devices included in the alarm system or other household devices (e.g., a thermostat, an appliance, lights, etc.). The transmission record 114 also may include information on the alarm event generating the monitoring signal data to determine whether the monitoring signal data contains life-critical information. For instances, if the transmitted monitoring signal data is generated from fire detector sensors, the system 100 may identify the data as life-critical within the transmission record 114.

The system 100 receives a second monitoring signal from a secondary communication device via a secondary communication path (330). In some instances, the application monitoring station 110 may receive multiple transmissions from several communication paths originating from the same one or more monitoring system control units 140, 150. For example, the application monitoring station 110 may receive a first monitoring signal data transmission from the monitoring system control unit 140 directly from the direct path transmission device 142 over network 105. The application monitoring station 110 may subsequently receive a second monitoring signal data transmission from the monitoring system control unit 150 from the direct path transmission device 152. In this example, the primary communication path may be the path between the direct path transmission device 142 over network 105 and the secondary communication device may be the monitoring system control unit 150 that received data from the monitoring system control unit 140 over the peer-to-peer communication path 160.

In some implementations, the application monitoring station 110 may receive redundant monitoring signal data from monitoring system control unit 140 via multiple communication pathways. For example, the first monitoring signal data transmission may be transmitted by a primary communication pathway that corresponds to the pathway formed between the direct path transmission device 142 and the application monitoring station 110 over network 105. The second monitoring signal transmission may be transmitted by a second communication pathway that corresponds to the pathway formed between a combination of the peer communication device 144 and the peer communication device 154 via peer-to-peer communication path 160, and the pathway formed between the direct path transmission device 152 and the application monitoring station 110 over network 105. In such examples, the monitoring signal data generated by the monitoring system control unit 140 may be segmented amongst different communication pathways to improve transmission efficiency and processed by the application monitoring station 110 once it has received all segments of the monitoring signal data.

In some examples, the monitoring signal data transmitted through multiple communication pathways from the same communication device may be redundantly transmitted based on the importance of the monitoring signal data to the user. For example, monitoring signal data that contains life-safety data may be transmitted through the primary communication pathway, whereas the non-critical monitoring signal data may be transmitted through the secondary communication pathway to prioritize the transmission of life-critical monitoring signal data by maximizing its transmission efficiency.

The system 100 compares data from the second received signal to data stored on the transmission record (340). For example, the application monitoring station 110 may compare a received monitoring signal from the one or more monitoring system control units 140, 150 to determine if it is a duplicate transmission that has been previously received by the application monitoring station 110 and is stored within the transmission record 114. The application monitoring station 110 may compare characteristics of the monitoring signal data transmission such as the property information for the alarm system that generated the monitoring signal, the alarm event that corresponds to the signal, as well as data parameters included within the transmission such as hash identifiers for transmission instance, or activity logs generated by the direct path transmission devices 142 and 152 or the peer communication devices 144 and 154, upon transmission of the received monitoring signal data transmission.

In some implementations, the application monitoring station 110 may only compare the data received for a certain time period (e.g., two to three minutes) to ensure its relevance to the existing received monitoring signal data within the transmission record 114. For example, the application monitoring station 110 may initially determine whether two received monitoring signal data transmissions were received below a specified time period to exclude the possibility that they may be two separate monitoring signal data transmissions from the same communication device. In such examples, the application monitoring station 110 may perform this preliminary comparison to conserve processing power required to perform subsequent comparisons to determine whether two received monitoring signal data transmissions are duplicate transmissions.

The system 100 determines if the data from the second received signal has been processed based on comparing the data from the second received signal to the data stored on the transmission record (350). For instance, the application monitoring station 110 may parse the transmission record 114 to determine whether any prior received monitoring signal data transmissions within a certain time period (e.g., two to three minutes) match the received monitoring signal data transmission. The application monitoring station 110 may determine that the data from the second monitoring signal data transmission has been previously processed if this comparison indicates that the alarm event represented in the monitoring signal data transmission is already represented within the transmission record 114.

In some implementations, the application monitoring station 110 may perform subsequent comparisons to determine whether the received monitoring signal data transmission contains supplementary information to an existing monitoring signal data transmission previously received and stored within the transmission record. For example, if a property generates an alarm event when incomplete information of its cause is available to the system 100, the first monitoring signal data transmission may include preliminary monitoring signal data that is stored within the transmission record 114. A subsequent second monitoring signal data transmission may be submitted once the system 100 has received more relevant information from service providers. In such examples, the second monitoring signal data transmission would be identified by the application monitoring station 110 as a related transmission of the same alarm event although the data from the second monitoring signal data transmission is already represented within the transmission record 114. In such examples, application monitoring station 110 may expedite the processing and storing operations of the second monitoring signal data transmission as it is related to an existing entry within the transmission record 114.

The system 100 performs a de-duplication operation based on determining the data from the second received signal has been processed (360). For instance, the application monitoring station 110 may create a temporary archive in memory to store monitoring signal data transmissions that the system 100 has identified as duplicate data transmissions. In such instances, the application monitoring station 110 may create a dedicated cache for such duplicate transmissions until the corresponding monitoring signal data transmission in the transmission record 114 has been transmitted to the appropriate resource and is removed from the transmission record. In some instances, the application monitoring station 110 may only store life-critical duplicate monitoring signal data transmissions in memory to conserve resources for other processes.

In some implementations, the de-duplication operation may include deleting the duplicate alarm-signal data transmission to reduce the likelihood of data redundancy within the transmission record 114. For example, the application monitoring station 110 may ignore the second monitoring signal data transmission and not carry out any processing or storing steps.

Figure 4:
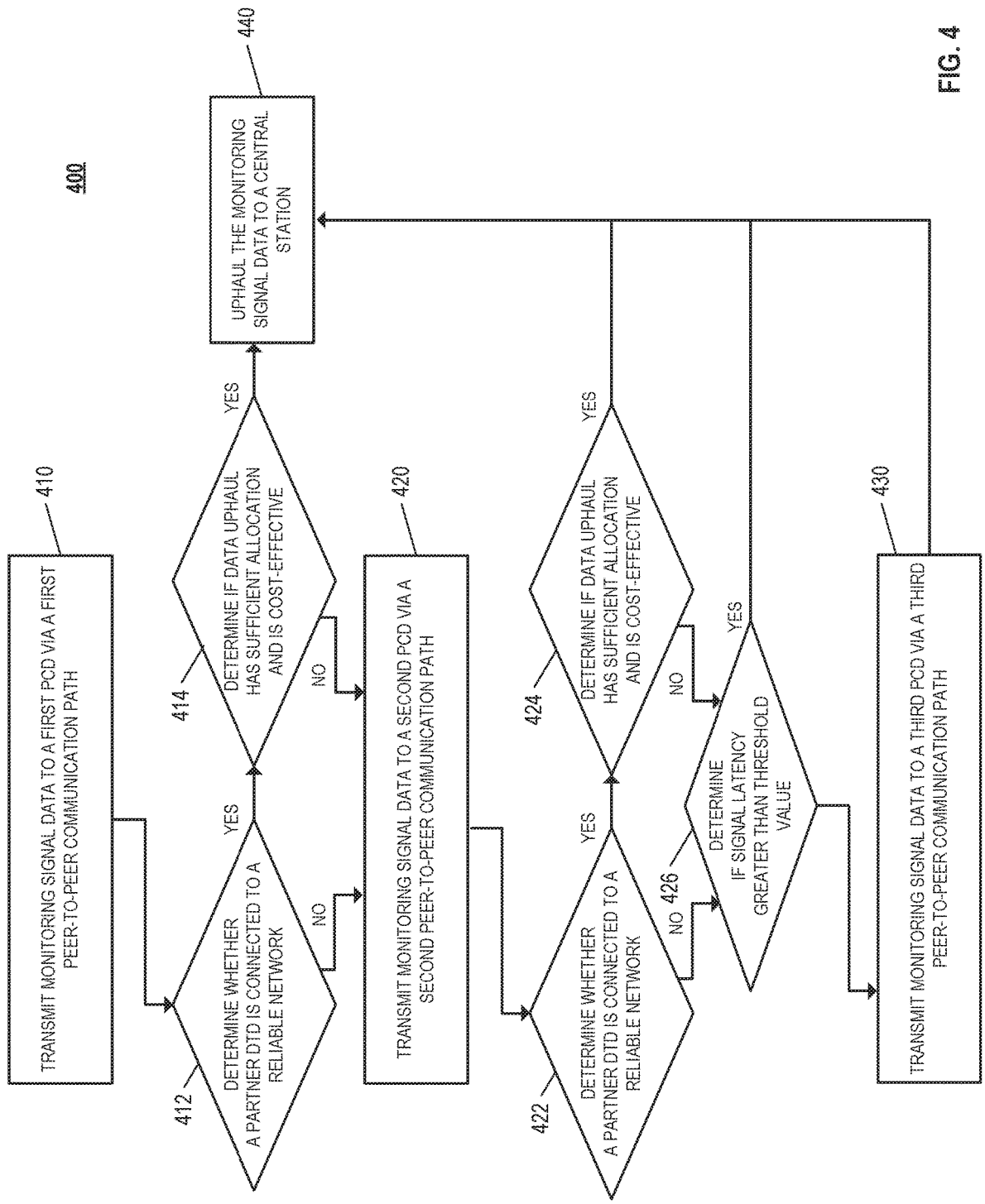
FIG. 4 illustrates an example of a process for determining when to uphaul monitoring signal data to an application monitoring station during a transmission of monitoring signal data between peer communication devices.

FIG. 4 illustrates an example process 400 for determining when to uphaul the monitoring signal data to an application monitoring station during a transmission of monitoring signal data between peer communication devices. The process 400 determines when to uphaul monitoring signal data based on whether a partner direct transmission device is connected to a reliable network and if the data uphaul has sufficient allocation and is cost-effective to the system.

The process 400 begins with the system 100 transmitting monitoring signal data to a first peer communication device via a first peer communication path (410). For example, the first peer communication device may be the monitoring system control unit 140 and the communication path may be between the direct path transmission device 140 and the application monitoring station 110 over network 105. The system 100 may determine whether a partner direct transmission device is connected to a reliable network (412). For example, the system 100 may analyze the connection of the direct path transmission device 142 to the network 105. The system 100 also may determine if data uphaul has sufficient allocation and is cost effective (414). For example, if the network connection of the direct path transmission device 142 has a low bandwidth or connection speed compared to the size of the monitoring signal data, the system 100 may determine that data uphaul may significantly reduce transmission efficiency. If the partner direct transmission device is connected to a reliable network and the data uphaul has sufficient allocation and is cost-effective, the system 100 uphauls the monitoring signal data to an application monitoring station (440), where the process 400 then ends.

If the system 100 determines that the partner direct transmission device is not connected to a reliable network, that there is insufficient allocation for the data uphaul, or that the data uphaul is too costly, the system 100 transmits the monitoring signal data to a second peer connection device via a second peer communication path (420). For example, the second peer connection device may be the monitoring system control unit 150 and the second peer communication path may be the peer-to-peer communication path 160. The system 100 may determine whether a partner direct transmission device is connected to a reliable network (422). For example, the system 100 may analyze the connection of the direct path transmission device 152 to the network 105. The system 100 also may determine if data uphaul has sufficient allocation and is cost effective (424). For example, if the network connection of the direct path transmission device 152 has a low bandwidth or connection speed compared to the size of the monitoring signal data, the system 100 may determine that data uphaul may significantly reduce transmission efficiency. If the partner direct transmission device is connected to a reliable network and the data uphaul has sufficient allocation and is cost-effective, the system 100 uphauls the monitoring signal data to an application monitoring station (440), where the process 400 then ends.

If the system 100 determines that the partner direct transmission device is not connected to a reliable network, that there is insufficient allocation for the data uphaul, or the data uphaul is too costly, the system 100 may determine if the signal latency is greater than a threshold value (426). For example, the latency of the data transmission may be monitored by a latency governor 170, which compares the current transmission latency to a threshold value. If the determined signal latency is higher than the threshold value, the system 100 uphauls the monitoring signal data to an application monitoring station (440), where the process 400 then ends.

If the determined signal latency is lower than the threshold value, the system 100 then transmits the monitoring signal data to a third peer connection device via a third peer communication path (430). The system 100 then uphauls the monitoring signal data to an application monitoring station (440), where the process 400 then ends.

Figure 5:
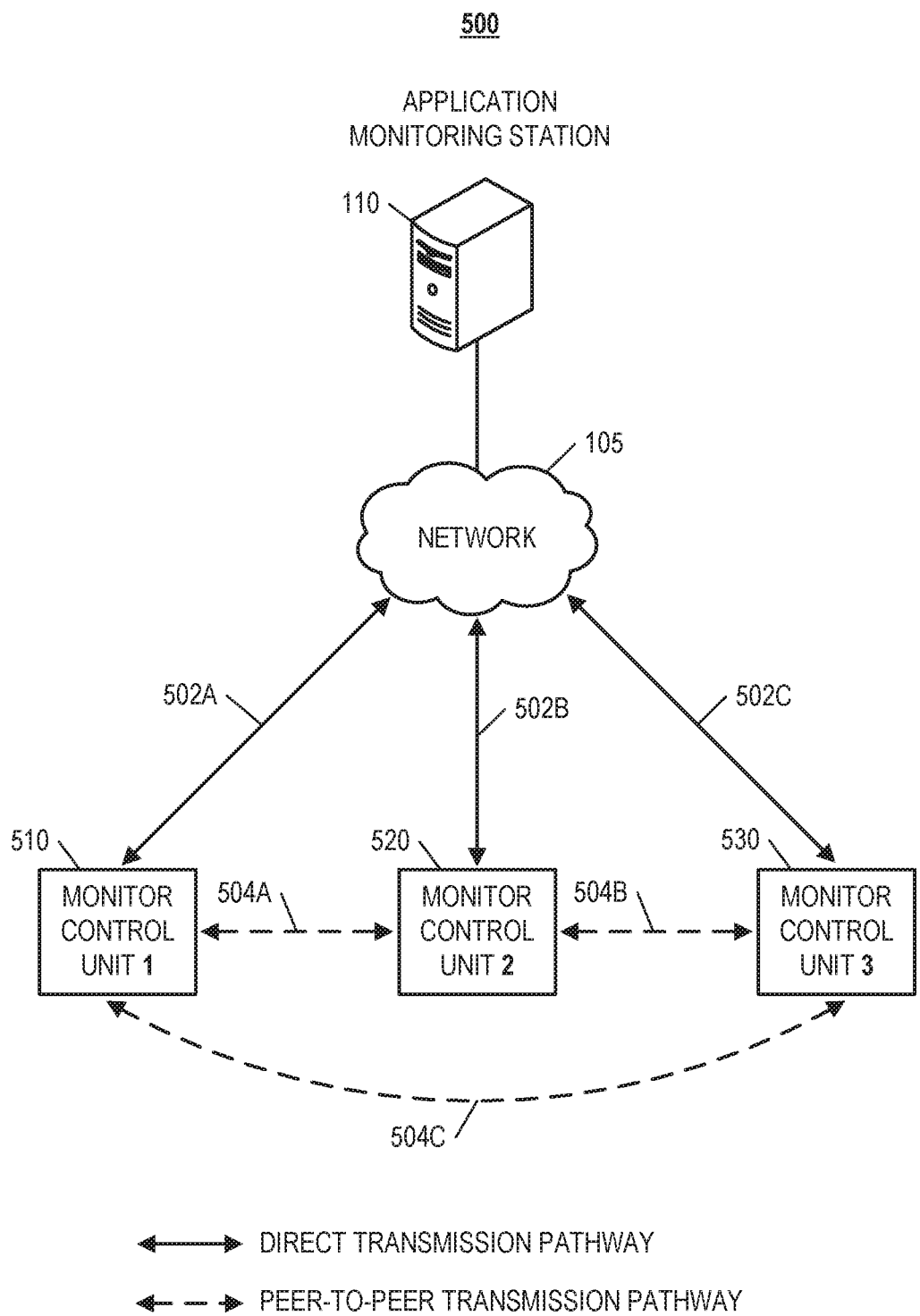
FIG. 5 illustrates an example of a hybrid mesh network between multiple monitor control units

FIG. 5 illustrates an example of a hybrid mesh network 500 between the application monitoring station 110 and multiple monitor control units 510, 520, and 530 over the network 105. As depicted, the hybrid mesh network 500 may include direct communication pathways 502A, 502B, 502C and peer communication pathways 504A, 504B, and 504C. In some implementations, the monitoring control units 510, 520, and 530 correspond to the monitoring control unit 140 as described previously with respect to FIG. 1.

Each of the multiple monitor control units 510, 520, and 530 may have different network attributes associated with the respective direct communication pathways and peer communication pathways. For example, the monitor control unit 510 may be configured to a local network that has a lower bandwidth and transmission speed compared to that of the monitor control units 520 and 530. In this regard, each of the direct communication pathways 502A, 502B, 502C, and each of the peer communication pathways 504A, 504B, and 504C may have different network attributes that impact transmission of monitoring system data (e.g., alarm event data) over the respective pathways.

As described previously, the application monitoring station 110 is capable of reconfiguring each of the monitoring control units 510, 520, and 530 to either maximize the cost-effectiveness, or reduce the transmission latency, of the transmission pathway between the application monitoring station 110 and a particular monitoring control unit. For instance, the application monitoring station 110 can compare the network attributes of the monitor control units 510, 520, and 530 to one or more standards associated with the transmission of the monitoring station data. The transmission standards can include a maximum latency for transmission, a maximum cost associated with transmission, an encryption standard for the transmission, and/or a combination of the above.

In reconfiguring each of the monitoring control units 510, 520, and 530, the application monitoring station 110 transmits configuration instructions to update the transmission pathway such that the updated transmission pathway satisfies the transmissions standards for transmission monitoring system data over the updated transmission pathway. For example, in response to determining that an initial transmission pathway for the monitoring control unit 510 including the direct transmission pathway 502A does not satisfy transmission standards, the application monitoring station 110 reconfigures the monitor control unit 510 to transmit monitoring station data over an updated transmission pathway. In this example, the updated transmission pathway can either include the peer communication pathway 504A and the direct communication pathway 502B through the monitor control unit 520, or the peer communication pathway 504C and the direct communication pathway 502C through the monitor control unit 530.

The network attributes of the updated transmission pathway can be compared against the initial transmission pathway in order to determine whether a reconfiguration would be beneficial to data transmission by the monitor control unit 510. In addition, alternatives of the updated transmission pathways (e.g., through the monitor control unit 520, or the monitor control unit 530) can also be evaluated by the application monitoring station 110 to determine the most applicable updated transmission pathway.

Figure 6:
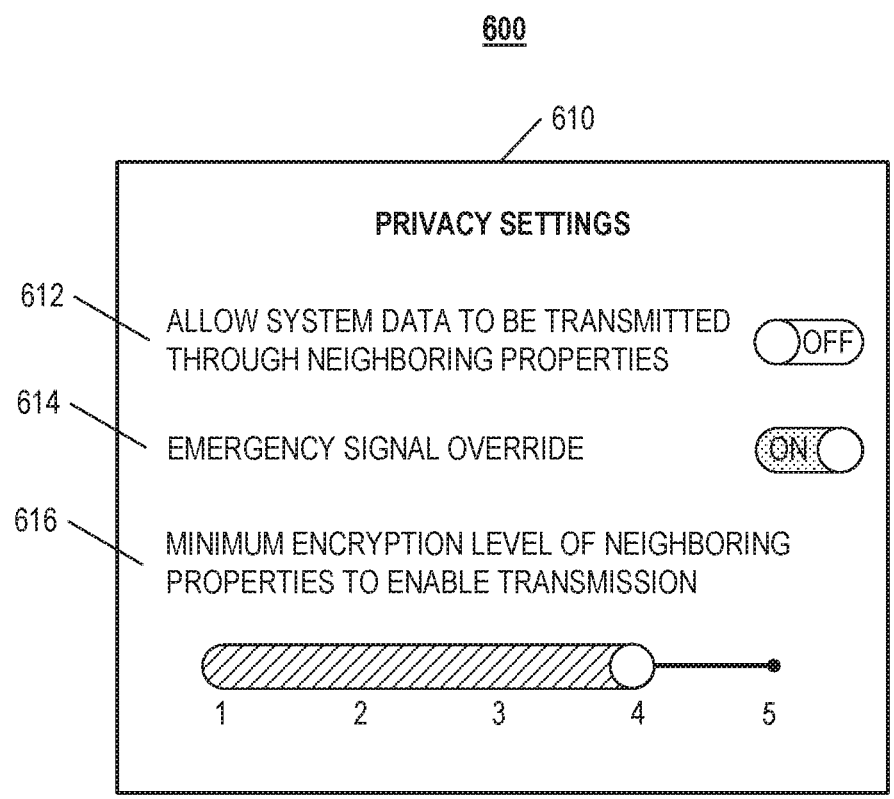
FIG. 6 illustrates an example of a user interface for configuring privacy settings for a hybrid mesh network

FIG. 6 illustrates an example of a user interface 600 for configuring privacy settings for a hybrid mesh network. The interface 600 can be provided on a display on the monitor control unit 140, or on user devices that are configured to exchange communications with the monitor control unit 140 over the network 105. For example, the interface 600 can be presented either as a webpage used by the user to adjust configuration settings for the system 100, or on a mobile application installed on the user device that receives information from the application monitoring station 110. In some instances, the mobile application may be provided by a third-party organization that provides monitoring services associated with the system 100.

As depicted, the interface 600 includes privacy features 612, 614, and 614, which enable the user of a property where the system 100 is located to control data transmissions to and from the monitor control unit, or control how the application monitoring station 110 processes updates to the hybrid mesh network 500 to reconfigure the transmission pathways of the monitor control unit, or the monitor control units or nearby properties. For example, privacy feature 612 allows a user to specify whether outgoing monitoring system data of the monitor control unit 140 can be transmitted to other monitor control units of neighboring properties (e.g., the monitor control unit 150) using over a peer communication pathway. A user may disable this feature if he/she is concerned about potential data breaches over the peer communication pathways, which could potentially enable other users to access sensitive data or information of the property where the monitor control unit 140 is located.

The privacy feature 614 allows a user to specify a transmission override for emergency monitor system data (e.g., life critical data, alarm data, fire safety data, etc.). For instance, if enabled, the monitor control unit 140 is configured to transmit monitoring system data over the peer communication pathway of the hybrid mesh network only in circumstances where the data is determined to indicate an emergency situation at or near the property where the monitor control unit 140 is located.

The privacy feature 616 allows a user to specify a minimum encryption level required to transmit monitoring system data over the peer communication pathways of monitor control units of nearby properties. For example, as depicted, a user can specify a level from "1" to "5," where "1" indicates a minimum encryption level and "5" indicates a maximum level. In response to receiving a user selection of a minimum encryption level, the application monitoring server 110 may initially categorize the monitoring stations of nearby properties based on a designated encryption level. The encryption level designations may be based on the specific encryption protocol used by the monitoring systems, or other system configurations that are used to predict a likelihood of a security breach during data transmissions over a communication pathway. In this regard, after receiving a user indication of a minimum encryption level, when reconfiguring the monitor control unit 140, the application monitoring station may select a subset of monitor control units of nearby properties that satisfy the encryption level designation.

Figure 7:
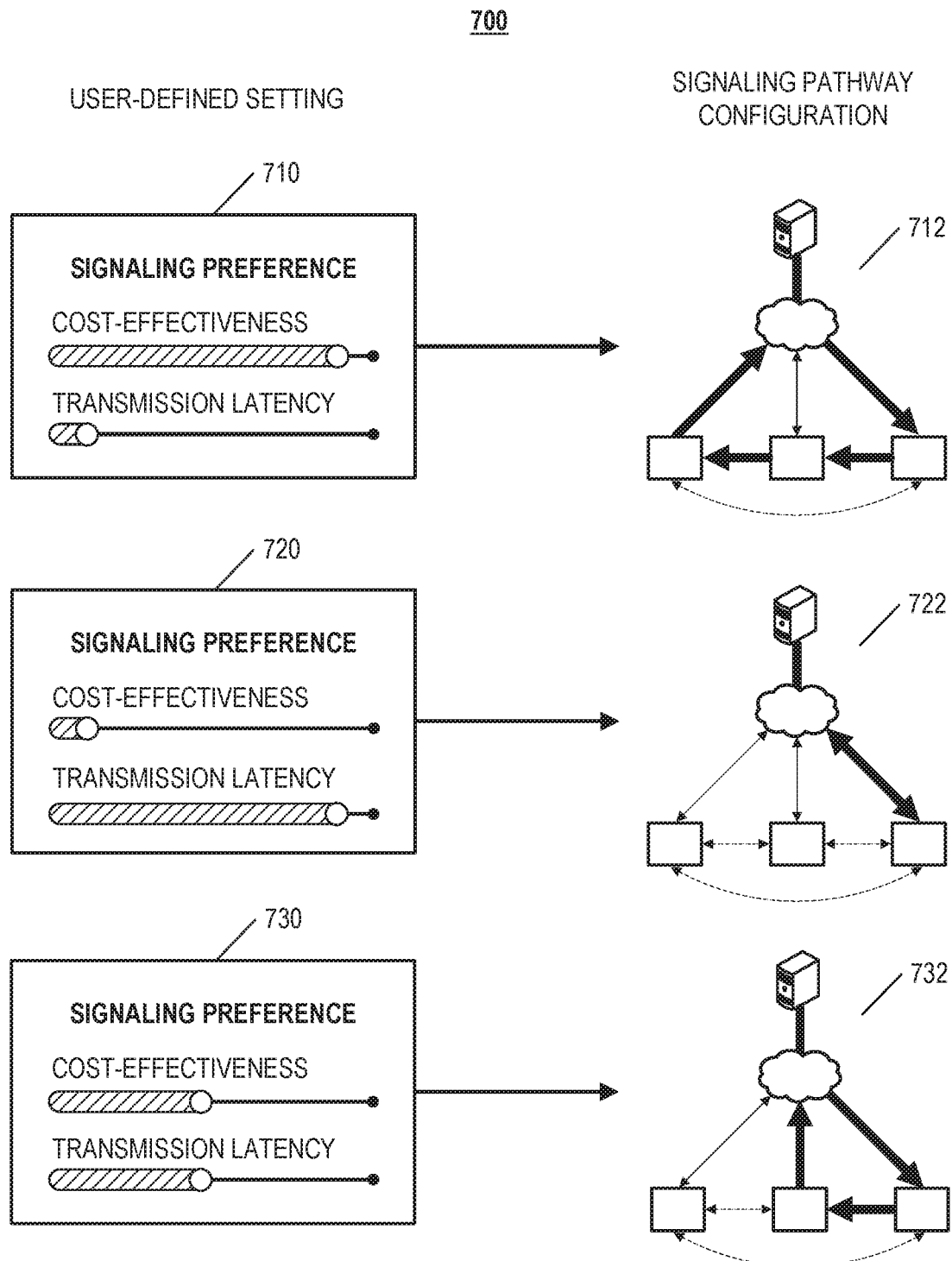
FIG. 7 illustrates examples of user-defined network configurations and corresponding signaling pathway configurations

FIG. 7 illustrates examples of user-defined network settings and corresponding signaling pathway configurations. As depicted, the user-defined settings 710, 720, and 730 are examples of different network configurations that prioritize different transmission standards (e.g., cost-effectiveness and transmission latency). The configurations 712, 722, and 732 depict examples of different configurations for a single hybrid mesh network that is responsive to the user-defined settings 710, 720, and 730. Although FIG. 7 depicts prioritization of two transmission standards, in other implementations, the system 100 may also provide the user with options to provide settings for other types of transmission standards that can also impact data transmissions over the direct communication pathways and the peer communication pathways of the hybrid mesh network. In some implementations, the monitor control units depicted in the configurations 712, 722, and 732 correspond to the monitor control units 510, 520, and 530.

The setting 710 reflects a preference for cost-effectiveness over transmission latency. Under such a configuration, the application monitoring station 110 adjusts the hybrid mesh network such that transmission of monitoring system data yields the lowest cost for the user of the monitor control 140 that originates the transmission signal to the application monitoring station 110. The clear preference for cost-effectiveness also results in a low preference for transmission latency as the hybrid mesh network may be configured to utilize particular peer communication pathways and direct communication pathways where data transmission results in a lower overall cost. In the example of the configuration 712, the application monitoring station 110 determines that this network configuration yields a lower overall cost by rerouting the signal through multiple monitor control units instead of transmitting the data through the direct communication pathway of the originating monitor control unit. This may be because the network attributes of the originating monitor control unit may have limited bandwidth, which makes transmission over its direct communication pathway prohibitively expensive.

Alternatively, the setting 720 reflects a preference for reducing transmission latency over cost-effectiveness. Under such a configuration, the application monitoring station 110 adjusts the hybrid mesh network such that transmission of monitoring system data yields the lowest latency (or shortest transmission time) to transmit the data to the application monitoring station 110 from the monitor control unit 140. As described above, this also results in a low prioritization for cost-effectiveness since the transmission pathways within the hybrid mesh network with the fastest transmissions are not likely to be the most cost-effective due to the network attributes required for high transmission speeds (e.g., high upload and download speeds, high bandwidth availability, etc.). In the example of the configuration 722, the application monitoring station 110 determines that this network configuration yields a higher transmission speed because it minimizes the number of transmission pathways necessary to transmit monitoring system data to the application monitoring station.

Finally, the setting 730 reflects a preference for balancing cost-effectiveness and minimizing transmission latency to an acceptable level. Under such a configuration, the application monitoring station 110 adjusts the hybrid mesh network by analyzing the different alternative configurations that are possible and selecting the particular configuration that yields a cost and transmission latency within a predetermined bandwidth. In the example of the configuration 732, the application monitoring station 110 initially identifies the network characteristics of the various possible transmission pathways between the combinations of the direct communication pathways and the peer communication pathways. Based on the identified network characteristics, the application monitoring station 110 then selects a particular network configuration that has an acceptable cost and transmission latency.

Figure 8:
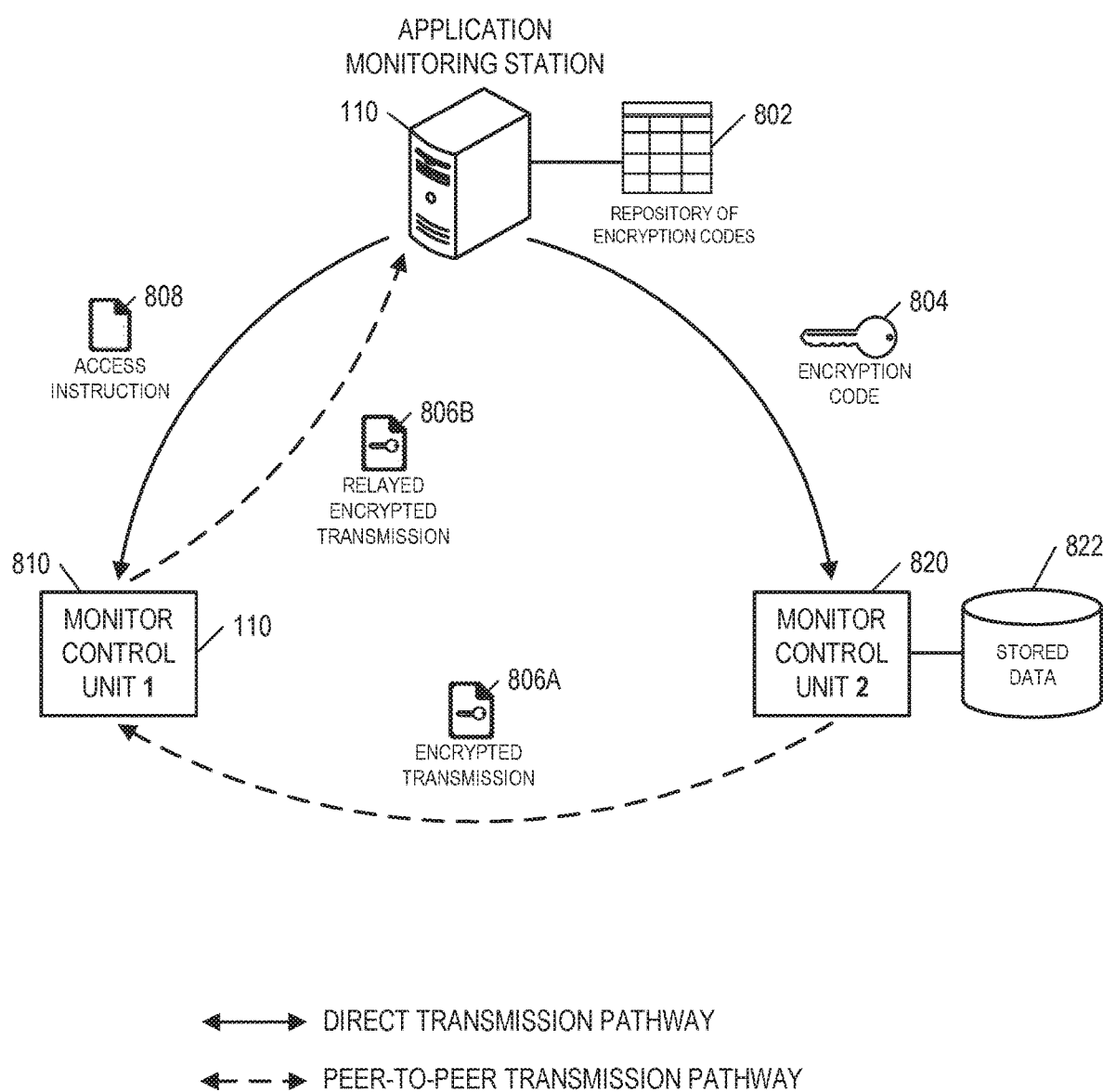
FIG. 8 illustrates an example of utilizing encrypted codes for encrypting data transmissions over a hybrid mesh network

FIG. 8 illustrates an example of utilizing encrypted codes for encrypting data transmissions over a hybrid mesh network. For instance, the application monitoring station 110 may store a repository of encryption codes 802 that includes a list of monitoring stations and corresponding encryption codes provided to encryption monitoring station data. For example, the encryption codes may be used to protect data transmissions over the monitor control units of nearby properties using one or more peer communication pathways.

In the example depicted, the monitor control unit 820 encrypts stored data 822 using an encryption code 804 provisioned by the application monitoring station 110. In response to receiving an instruction to transmit the stored data 822 through the peer communication pathway of the monitor control unit 810, the monitor control unit 820 initially encrypts the stored data 820 using the encryption code 804. The monitor control unit 820 then transmits the encrypted transmission 806A over a peer communication pathway to the monitor control unit 810.

In addition to transmitting encryption codes to monitor control units, the application monitoring station 110 may also transmit access instructions to the monitor control units of nearby properties. For example, as depicted, the application monitoring station 110 transmits an access instruction to the monitor control unit 810, which enables the monitor control unit 810 to receive the encrypted transmission 806A and transmit the relayed encryption transmission 806B to the application monitoring station 110 to complete the data transmission over the peer communication pathway.

Although FIG. 8 depicts one example of an access instruction (e.g., the access instruction 808), in some implementations, the application monitoring station 110 may transmit different access instructions with varying levels of access based on the network attributes of the originating monitor control unit (e.g., the monitor control unit 820 in the FIG.) and the individual monitor control units that obtain encrypted transmissions from the originating monitor control unit (e.g., the encrypted transmission 806A). In such implementations, the access instructions can be used to ensure sufficient security during data transmissions.

Figure 9:
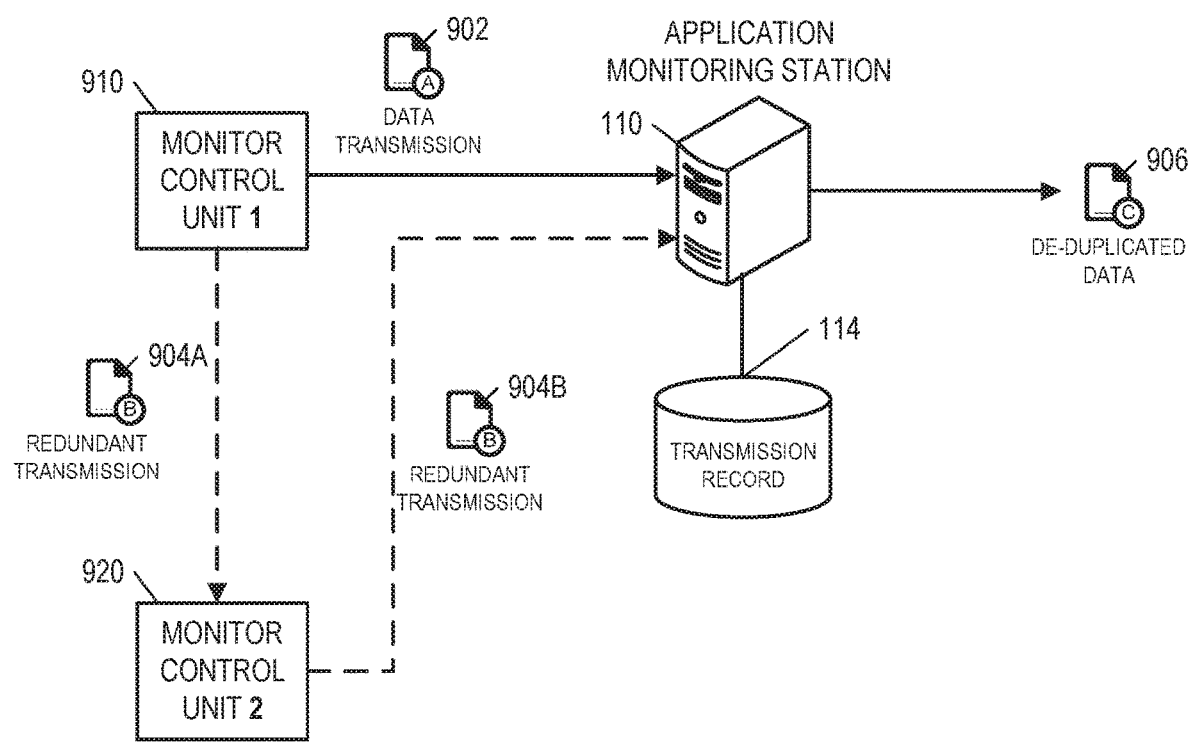
FIG. 9 illustrates an example of de-duplicating data transmissions over a hybrid mesh network

FIG. 9 illustrates an example of de-duplicating data transmissions over a hybrid mesh network. For instance, the monitor control unit 910 may transmit a data transmission 902 to the application monitoring station 110 through a direct transmission pathway, and also transmit a redundant transmission 904A to the monitor control unit 920, when then transmits the redundant transmission 904B to the application monitoring station 110 through a peer communication pathway. As described previously, although the specific transmission pathway may be selected based on configuring the monitor control unit 910, in some circumstances, duplicates of monitoring system data can be included in both transmission pathways.

As described previously with respect to FIG. 1, the application monitoring station 110 stores the transmission record 114 for tracking incoming transmissions of monitoring system data from various monitor control units. For instance, the records indicate the originating monitor control unit that generates the monitoring system data, the transmission pathway within the hybrid mesh network used to transmit the data to the application monitoring station 110, and the monitor control units of nearby properties that relay monitoring system data through peer communication pathways.

The transmission record 114 can also be used by the application monitoring station to identify and delete duplicate data within different data transmissions (e.g., data transmission 902 and redundant transmission 904B) from the same originating monitor control unit (e.g., the monitor control unit 910) using different transmission pathways. In this regard, the transmission record 114 can be used to more efficiently store monitoring system data for a plurality of properties by generating de-duplicated data 906.

In some implementations, generation of the de-duplicated data 906 by the application monitoring station 910 includes consolidating multiple data transmissions by the same originating monitor control unit over a particular period of time (e.g., weekly, monthly, etc.) for more efficient storage of monitoring system data. For example, the data transmissions specified by the transmission record 114 can initially be stored in a cache or temporary storage for the particular period of time, and afterwards, the application monitoring station can utilize the transmission record 114 to generate the de-duplicated data 906 representing an aggregate data file that combines the data of each of the individual data transmissions. In this regard, the de-duplication process can be used to cache data in a more efficient manner in addition to identifying duplicate instances of transmitted data.

Figure 10:
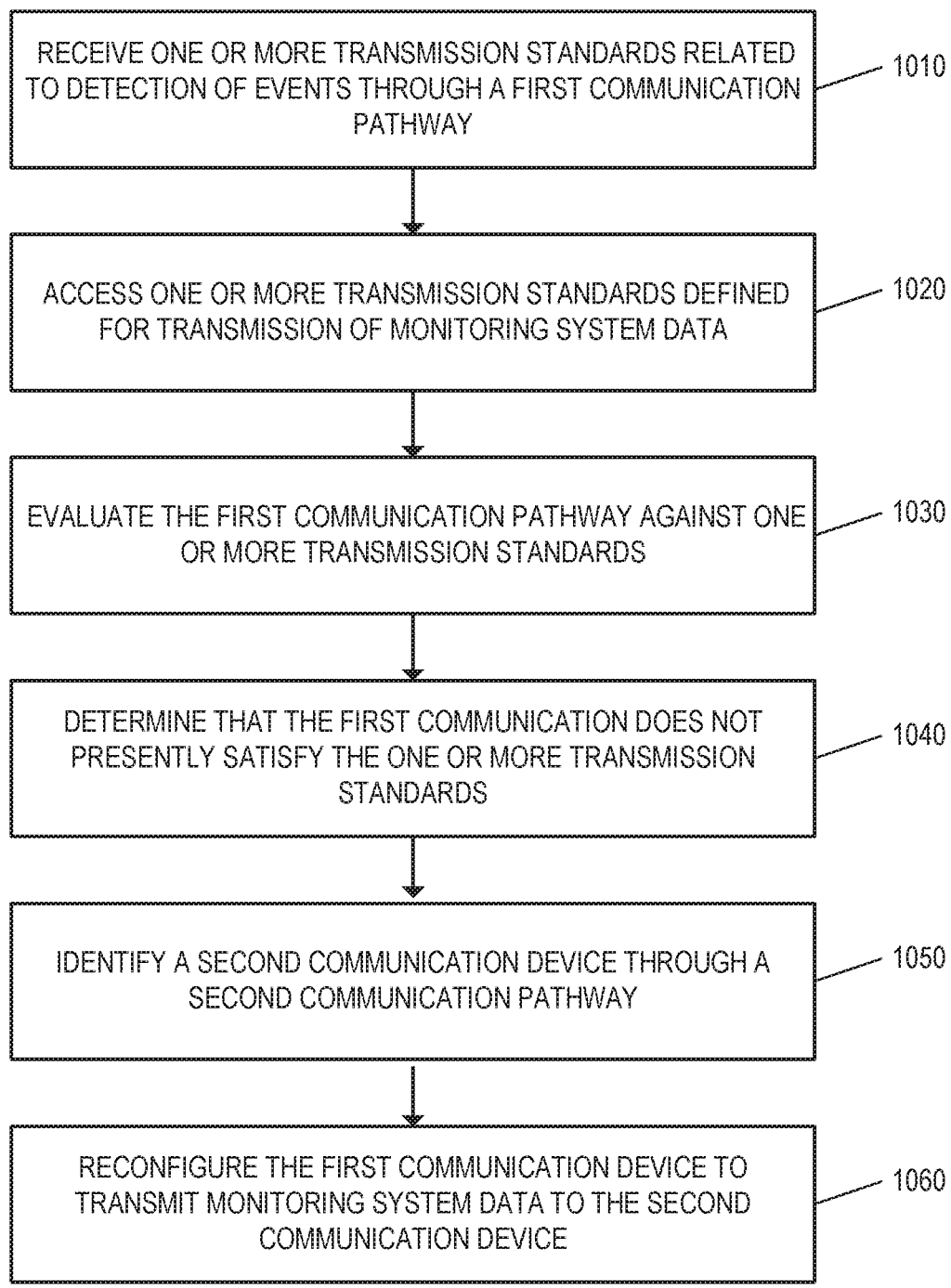
FIG. 10 illustrates an example process of reconfiguring a signaling pathway configuration for a monitor control unit.

FIG. 10 illustrates an example process 1000 of reconfiguring a signaling pathway configuration for a monitor control unit. Briefly, the process 1000 may include receiving one or more transmission standards related to detection of events through a first communication pathway (1010), access one or more transmission standards defined for transmission of monitoring system data (1020), evaluating the first communication pathway against one or more transmission standards (1030), determining that the first communication does not presently satisfy the one or more transmission standards (1040), identifying a second communication device through a second communication pathway (1050), and reconfiguring the first communication device to transmit monitoring system data to the second communication device (1060).

In more detail, the process 1000 may include receiving one or more transmission standards related to detection of events through a first communication pathway (1010). For instance, the application monitoring station 110 may receive one or more data transmissions related to detection of events at a property by the system 100 through a direct communication pathway between the application monitoring station 110 and the direct path transmission device 142 of the monitor control unit 140.

The process 1000 may include access one or more transmission standards defined for transmission of monitoring system data (1020). For instance, the application monitoring station 110 may access one or more transmission standards defined for transmission of monitoring system data by the system 100 of the property. For example, the one or more transmission standards can include a maximum cost of data transmission, user-defined privacy settings for data transmissions, or a maximum transmission latency of data transmission.

The process 1000 may include evaluating the first communication pathway against one or more transmission standards (1030). For instance, the application monitoring station 110 may evaluate the direct communication pathway between the application monitoring station 110 and the direct path transmission device 142 of the monitor control unit 140 by estimating network attributes of the direct communication pathway and comparing the estimated network attributes to the one or more transmission standards for the property.

The process 1000 may include determining that the first communication does not presently satisfy the one or more transmission standards (1040). For instance, the application monitoring station 110 may determine that the network attributes associated with the direct communication pathway does not satisfy the one or more transmission standards of the property. For example, as described previously, this can include if the data transmission is estimated to be prohibitively costly above the maximum transmission cost for the property, if the estimated latency is above the maximum transmission latency, or other factors. In one particular implementation, the data transmission may indicate the presence of a life-critical alarm event at the property (e.g., a fire, carbon monoxide detection, security breach, etc.). In such an implementation, the application monitoring station 110 may determine that the direct communication pathway does not satisfy the one or more transmission standards if the monitor control unit 140 is presently unable to send the data transmission to the application monitoring station 110 (e.g., if the monitor control unit 140 has lost network connectivity).

The process 1000 may include identifying a second communication device through a second communication pathway (1050). For instance, based on the determination that the direct communication pathway does not presently satisfy the one or more transmission standards, the application monitoring station 110 may identify the monitor control unit 150, which is configured to exchange communications with the application monitoring station 110 using a direct communication pathway between the application monitoring station 110 and the direct path transmission device 152. In addition, as described previously, the application monitoring station 110 may also determine that the peer communication device 152 is capable of exchanging data communications with the peer communication device 154 over the peer communication pathway 160.

The process 1000 may include reconfiguring the first communication device to transmit monitoring system data to the second communication device (1060). For instance, the application monitoring station 110 may reconfigure the monitor control unit 140 to transmit monitoring system data detected by the system 100 at the property to the monitor control unit 150 of a nearby property using the peer communication pathway 160. As described previously, the reconfiguration can be used to adjust the transmission of monitoring system data from the direct communication pathway between the application monitoring station 110 and the direct path transmission device 140 to the peer communication pathway 160 between the peer communication devices 144 and 146, and then to the direct communication pathway between the application monitoring station 110 and the direct path transmission device 152. In this regard, the monitor control unit 140 can be reconfigured to alternatively transmit monitoring system data to the application monitoring station 110 in circumstances where the direct communication pathway of the direct path transmission device 142 is presently unavailable.

The described systems, methods, and techniques may be implemented in digital electronic circuitry, computer hardware, firmware, software, or in combinations of these elements. Apparatus implementing these techniques can include appropriate input and output devices, a computer processor, and a computer program product tangibly embodied in a machine-readable storage device for execution by a programmable processor. A process implementing these techniques can be performed by a programmable processor executing a program of instructions to perform desired functions by operating on input data and generating appropriate output. The techniques can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing can be supplemented by, or incorporated in, specially designed application-specific integrated circuits (ASICs).

It will be understood that various modifications can be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. An electronic system comprising:
   at least one processor; and
   at least one computer-readable medium coupled to the at least one processor having instructions stored therein which, when executed by the at least one processor, causes the at least one processor to perform operations comprising:
     receiving one or more encryption codes via a direct path transmission from an application monitoring station to a monitoring system control unit located at a monitored property, the application monitoring station being located remote from the monitored property;
     establishing a peer-to-peer communication path with a peer communication device based on the one or more encryption codes, the peer-to-peer communication path providing a path between the application monitoring station and the monitoring system control unit through the peer communication device, wherein the peer communication device is located at a neighboring property of the monitored property and the peer-to-peer communication path is established based on a privacy setting specifying that a user of the monitoring system control unit allows outgoing monitoring system data of the monitoring system control unit to be transmitted through neighboring properties;
     performing a test to automatically verify and evaluate the peer-to-peer communication path; and
     designating the peer-to-peer communication path as a primary path for monitoring signal transmission between the application monitoring station and the monitoring system control unit based on a result of the test to automatically verify and evaluate the peer-to-peer communication path,
   wherein performing the test to automatically verify and evaluate the peer-to-peer communication path comprises comparing monitoring signal data received by the application monitoring station over the peer-to-peer communication path to original monitoring signal data generated at the monitoring system control unit to determine data retention during transmission of the monitoring signal data received by the application monitoring station over the peer-to-peer communication path.

2. The system of claim 1, wherein receiving one or more encryption codes via the direct path transmission from the application monitoring station comprises receiving an encryption code that is associated with an alarm system connected to the application monitoring station.

3. The system of claim 1, wherein receiving one or more encryption codes via the direct path transmission from the application monitoring station comprises receiving unique encryption codes for multiple monitoring system control units associated with the application monitoring station.

4. The system of claim 1, wherein receiving one or more encryption codes via the direct path transmission from the application monitoring station comprises receiving one or more encryption codes transmitted, over a network, to the application monitoring station via one or more direct path transmission devices.

5. The system of claim 1, wherein establishing the peer-to-peer communication path with the peer communication device based on the one or more encryption codes comprises establishing the peer-to-peer communication path between multiple monitoring system control units and the peer communication device based on multiple encryption codes.

6. The system of claim 5:
wherein the multiple encryption codes are associated with the multiple monitoring system control units; and
wherein establishing the peer-to-peer communication path between the multiple monitoring system control units and the peer communication device comprises using the multiple encryption codes to establish the peer-to-peer communication path between the multiple monitoring system control units to create a bridge between the peer communication device and an additional peer communication device.

7. The system of claim 1, wherein performing the test to automatically verify and evaluate the peer-to-peer communication path comprises performing a transmission verification test by transmitting a preliminary signal over the peer-to-peer communication path.

8. The system of claim 1, wherein performing the test to automatically verify and evaluate the peer-to-peer communication path comprises measuring at least one performance parameter and conducting at least one test to determine at least one of speed, accuracy, or efficiency of the data transmission over the peer-to-peer communication path.

9. The system of claim 8, wherein measuring at least one performance parameter comprises measuring at least one of signal latency, transfer rate, or network integrity.

10. The system of claim 8, wherein conducting at least one test comprises performing at least one of data hash comparisons and cyclic redundancy checks.

11. The system of claim 1, wherein designating the peer-to-peer communication path as the primary path for monitoring signal transmission based on the result of the test to automatically verify and evaluate the peer-to-peer communication path comprises limiting, based on testing of the peer-to-peer communication path, alternative communication pathways for monitoring signal data from the monitoring system control unit.

12. The system of claim 11, wherein limiting, based on testing of the peer-to-peer communication path, alternative communication pathways for monitoring signal data from the monitoring system control unit comprises comparing transmission performance between the peer-to-peer communication path to the alternative communication pathways to designate the primary path for monitoring signal data.

13. The system of claim 1, wherein designating the peer-to-peer communication path as the primary path for monitoring signal transmission based on the result of the test to automatically verify and evaluate the peer-to-peer communication path comprises utilizing the application monitoring station as a backend controller to designate communication pathways for monitoring signal data between multiple monitoring system control units.

14. The system of claim 1, wherein designating the peer-to-peer communication path as the primary path for monitoring signal transmission based on the result of the test to automatically verify and evaluate the peer-to-peer communication path comprises temporarily disabling transmission of monitoring signal data from direct path transmission devices to allow transmission via the peer communication path.

15. The system of claim 1, wherein designating the peer-to-peer communication path as the primary path for monitoring signal transmission based on the result of the test to automatically verify and evaluate the peer-to-peer communication path comprises monitoring multiple communication pathways formed between the monitoring system control unit and the application monitoring station and designating a primary path based on conducting a test on each pathway to determine a most efficient communication pathway.

16. The system of claim 1, wherein the operations comprise utilizing multiple communication pathways as a redundant transmission mechanism to the primary path.

17. The system of claim 16, wherein utilizing multiple communication pathways as a redundant transmission mechanism to the primary path comprises utilizing the primary path to transmit critical life-safety monitoring signal data from the monitoring system control unit and using an alternative path to transmit other monitoring signal data from the monitoring system control unit identified as non-crucial.

18. The system of claim 16, wherein utilizing multiple communication pathways as a redundant transmission mechanism to the primary path comprises:
assessing monitoring signal data generated by the monitoring system control unit and assigning different categories for the assessed monitoring signal data based on severity; and
transmitting the categorized monitoring signal data across the multiple communication pathways.

19. The system of claim 16, wherein utilizing multiple communication pathways as a redundant transmission mechanism to the primary path comprises redundantly transmitting, to the application monitoring station, monitoring signal data from the monitoring system control unit over both the peer-to-peer communication path and the direct transmission path.

20. A method performed by one or more computers, the method comprising:
receiving one or more encryption codes via a direct path transmission from an application monitoring station to a monitoring system control unit located at a monitored property, the application monitoring station being located remote from the monitored property;
establishing a peer-to-peer communication path with a peer communication device based on the one or more encryption codes, the peer-to-peer communication path providing a path between the application monitoring station and the monitoring system control unit through the peer communication device, wherein the peer communication device is located at a neighboring property of the monitored property and the peer-to-peer communication path is established based on a privacy setting specifying that a user of the monitoring system control unit allows outgoing monitoring system data of the monitoring system control unit to be transmitted through neighboring properties;

performing a test to automatically verify and evaluate the peer-to-peer communication path; and designating the peer-to-peer communication path as a primary path for monitoring signal transmission between the application monitoring station and the monitoring system control unit based on a result of the test to automatically verify and evaluate the peer-to-peer communication path, wherein performing the test to automatically verify and evaluate the peer-to-peer communication path comprises comparing monitoring signal data received by the application monitoring station over the peer-to-peer communication path to original monitoring signal data generated at the monitoring system control unit to determine data retention during transmission of the monitoring signal data received by the application monitoring station over the peer-to-peer communication path.

* * * * *